Oct. 29, 1946.  R. J. BURROWS ET AL  2,410,011
RAIL TRUCK
Filed Dec. 11, 1944  3 Sheets-Sheet 1

INVENTORS
Robert J. Burrows
Alfred O. Williams
BY Walter E. Schirmer
Attorney

Oct. 29, 1946.        R. J. BURROWS ET AL         2,410,011
                           RAIL TRUCK
                    Filed Dec. 11, 1944          3 Sheets-Sheet 3

INVENTORS
Robert J. Burrows
Alfred O. Williams
BY
Walter E. Schirmer
Attorney

Patented Oct. 29, 1946

2,410,011

UNITED STATES PATENT OFFICE 2,410,011

RAIL TRUCK

Robert J. Burrows and Alfred O. Williams, Battle Creek, Mich., assignors to Clark Equipment Company, Buchanan, Mich., a corporation of Michigan Application December 11, 1944, Serial No. 567,618

10 Claims. (Cl. 105—182)

This invention relates to rail trucks, and more particularly is directed to a rail truck of the type used for street, elevated and subway rail transportation of the rapid transit type.

Rail trucks of this general design operated by a driving motor carried in the truck itself have been in use for some time and have been conventionally designed with the use of tubular side frame members carrying therebetween a transverse swinging bolster, and having vertical rubber spring suspension for supporting the truck on the car axles.

The present invention contemplates a departure from the construction in providing plate-like side frame members which at their extremities are supported by the use of coil springs from suitable spring pots carried by axle housings, and are intermediately supported between the axles by the use of leaf springs arranged in a novel manner to provide proper deflection ratios as well as to provide for accommodating torque reactions caused in driving or braking of the vehicle.

More specifically the present spring suspension contemplates a vertically coiled spring at each extremity of the truck side frame member, the spring being seated in a suitable support carried by the axle housing. On the adjacent inner faces of the axle housing there is provided suitable brackets for mounting a leaf spring member that has its center secured to the side frame member, and its ends supported on the axle housing, and a pair of half leaf spring members rigidly supported on the axle housing, and having the free ends connected to the side frame member, the two halves being arranged below and substantially parallel to the elongated main spring member to provide for taking care of torque reactions and preventing relative rotation of the axle housing. If desired, conventional torque arms may be used, in certain instances, in place of these half spring members.

This type of construction renders itself admirably suited to the construction of a rail truck having appreciable lateral and longitudinal stability without sacrificing any of the desired cushioning action required for the comfort of the passengers during operation of the vehicle. Also, by the use of a plate member in place of the tubular side frame member there is an appreciable saving in weight of this member while yet maintaining the desired structural characteristics required in a truck of this type. The spring suspension provides for deflection of the truck frame relative to the truck axles in a substantially vertical plane, the leaf spring members preventing any lateral or longitudinal instability, and the coil spring members acting as cushioning means which conjointly with the leaf spring provides the desired spring ratio deflection for the loads carried.

Still another feature of the present design is a provision of a light-weight truck of relatively simplified construction in which the springs can be preloaded to a certain extent and in which the axle housing is maintained against torque reactions which is especially desirable in view of the braking reactions taken on the housing through the use of regenerative braking of the electric drive motor and the use of magnetic track brake shoes which react against suitable bumper members also carried by the axle housing.

Other objects and advantages of the present invention will appear more fully from the following detailed description which, taken in conjunction with the accompanying drawings, will disclose to those skilled in the art the particular construction and operation of a preferred form of the present invention.

Figure 1:
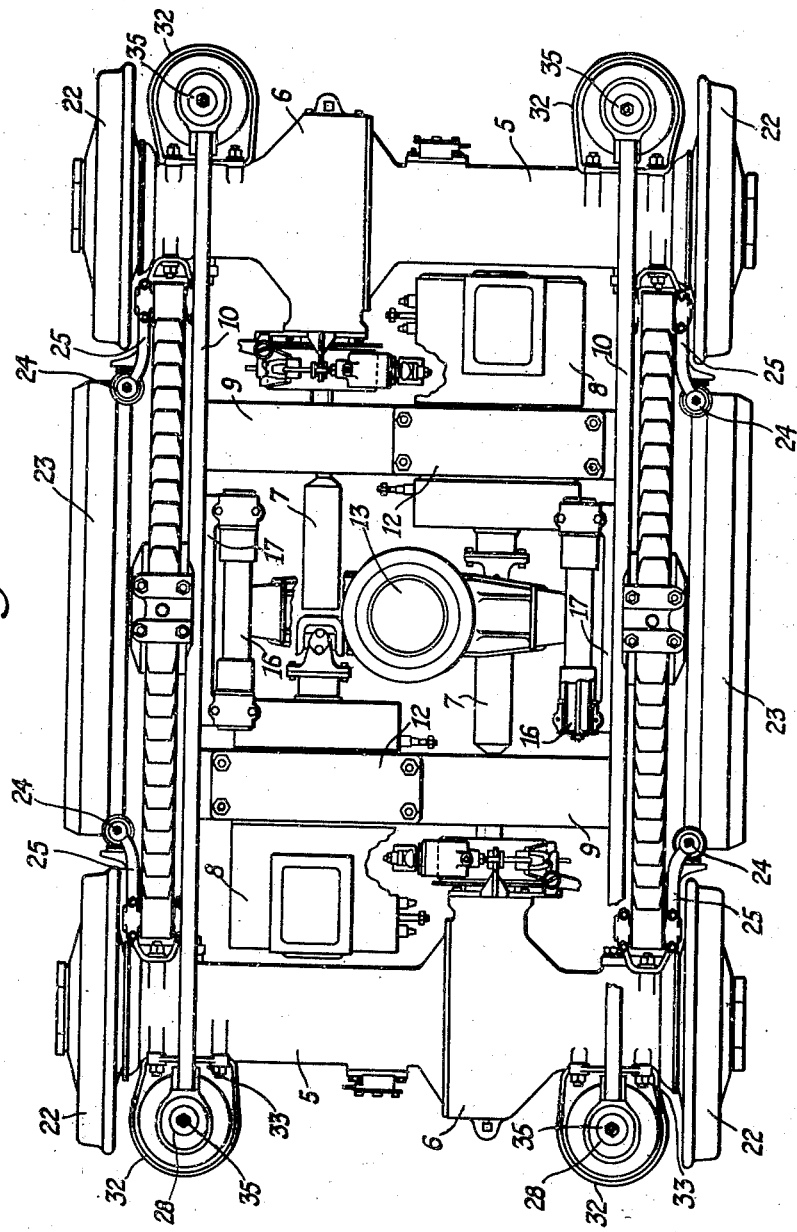
Figure 1 is a top plan view of a rail truck embodying the present invention.

Referring now in detail to the drawings, it will be noted that the truck consists primarily of a pair of axle housings 5 having enlarged gear-enclosing portions 6 adapted to contain ring gears pressed on the axle shaft and adapted to be driven by pinion gears from the propeller shafts 7 extending to the drive motors 8.

The drive motors 8 extend in opposite directions and are adapted to be supported in lateral offset position by means of cross frame members 9, which members at their ends are welded or otherwise suitably secured to the side frame members 10 and which are provided with cradle portions for receiving the motors 8, the motors being clamped in position by means of the arcuate cap members 12.

Figure 4:
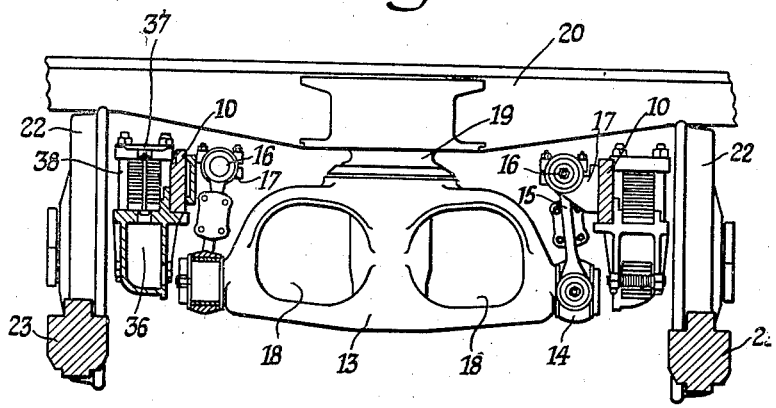
Figure 4 is a mid-section view through the swing bolster.

Intermediate the transverse cross frame members 9 there is provided a bolster indicated generally at 13 which is trunnioned at its ends in cross members 14 as shown in Figure 4, these cross members being supported from the swing links 15 pivotally connected to the ends of the cross members 14 and extending vertically upwardly and inwardly to pivotal connections on the pivot shaft 16 carried by bracket members 17 secured to the longitudinal side frame members 10. The bolster 13 is provided with openings 18 on opposite sides of the center thereof through which extend the propeller shafts 7 and at its center upper portion is provided with the king pin supporting seat 19 adapted to receive the bolster king pin carried by the cross sill 20 of the vehicle body.

Figure 2:
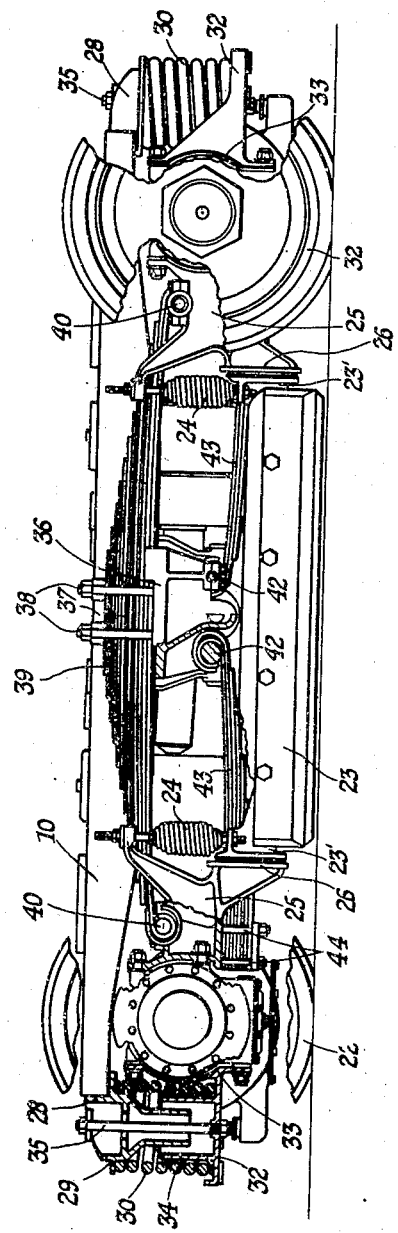
Figure 2 is a side elevational view with parts broken away in section of the truck shown in Figure 1.
Figure 3:
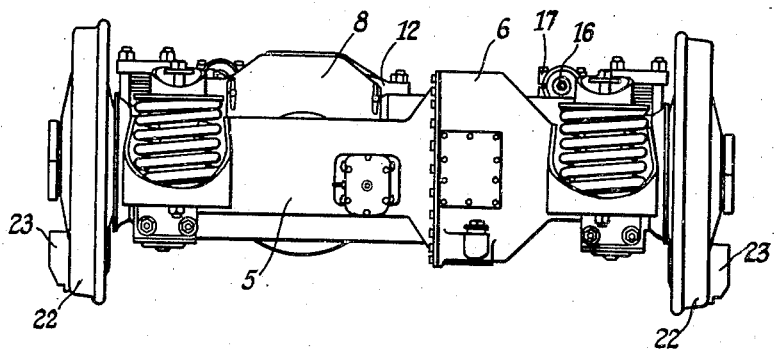
Figure 3 is an end elevational view of the truck shown in Figure 1.

The axle shafts extending through the housings 5 are provided at their opposite ends with the pressed-on track wheels 22 adapted to engage the rails upon which the vehicle operates. Intermediate the wheels 22 on each side of the truck is provided the magnetic track brake shoes 23. These shoes are of conventional design and need no detailed description. These shoes are transversely interconnected through a suitable framework 23' which is suspended by means of the spring members 24 from suitable brackets or supports 25 bolted or otherwise secured to the axle housing as shown clearly in Figures 1 and 2. The supports also provide suitable vertical face members 26 acting as bumpers to take the braking action of the framework 23' when the brakes are energized to magnetically grab the track rail.

The extremities of the side frame member 10 are welded or otherwise suitably secured in hollow post members 28 which are provided with flanges 29 forming the upper seat for vertical coiled spring members 30 which are seated at their lower ends in a spring pot 32 bolted or otherwise secured to the outer annular face of the axle housing 5 as indicated at 33. The spring pot 32 is preferably provided with an internal vertical cylindrical flange 34 forming a centering means for the lower end of the coil spring and preferably suitable tie rods 35 are provided for preventing vertical displacement of the side frame members 10 relative to the spring pots 32.

Substantially at the center of the side frame members 10 there is provided a spring clamp bracket 36 shown more in detail in Figure 4, this bracket being provided with a flange extending under the lower edge of the side frame members 10 and being provided with a cap 37 which is tied to the bracket 36 by means of the spring bolts 38. Clamped between the cap member 37 and the bracket 36 is the center portion of an elongated leaf spring indicated generally at 39. This leaf spring has its extremities engaging about the pin members or pivots 40 supported at and carried by suitable brackets formed on the support member 25 whereby relative deflection between the side frame members 10 and the support 25 secured to the axle housing is provided.

The spring bracket member 36 adjacent its lower end is provided with secondary pivot members 42 which form pivotal supports for the free ends of shorter leaf springs 43 which extend in opposite directions therefrom and are suitably anchored by means of the spring clamps 44 on the bracket member 25 adjacent the housing 5. It will be noted therefore that the one spring member 39 in effect constitutes two half leaf spring members anchored conjointly to the side frame member 10 intermediate its ends, and pivotally connected as at 40 to the axle housing, while the other two spring members 43 are rigidly connected to the housing 5 and are pivotally connected to the side frame member 10 through the pivots 42. From this construction it will be seen that the springs act in a longitudinal direction as torque reaction means and because of their flexibility provide a substantially parallelogram movement, insuring that the housings 5 will have no relative displacement upon deflection of the side frame members and the truck body relative to the axles. The coil spring members 30 provide the vertical cushioning action along with the springs 39 and 43, and due to the mounting of the spring members 39 and 43 it will be seen that lateral and longitudinal stability of the side frame members relative the axle housings is provided.

It will be apparent that upon deflection of the spring member 39 caused by downward movement of the side frame member 10 relative to the housings 5 the pivot members 40 tend to be spread apart due to the lengthening of the spring. However, this is counteracted by the fact that the bracket 36 which moves downwardly also tends to carry with it the pivots 42. This movement tends to straighten the spring members 43 also, which reaction is taken by the support member 25 and is balanced by the reaction in the opposite direction from the ends of the spring member 39 inasmuch as the spring 39 is connected to the housing above the center line of the axis thereof, whereas the springs 43 are connected below the axle center line. As a result a simplified but positive springing arrangement is provided which will produce the desired rate of deflection for the comfort of the passengers and will also provide proper torque reaction to insure stability of the truck and prevent rotation of the housings 5 upon relative movement of the axles and truck frame.

We are aware that various changes may be made in certain details of the construction, and therefore do not intend to be limited except as defined by the scope and spirit of the appended claims.

We claim:

1. In a rail truck, a truck frame including longitudinally extending side frame members rigidly spaced apart by intermediate transverse cross members, truck axles including axle housings extending transversely beneath opposite ends of said side frame members and having spring brackets on opposite sides of the axis thereof at each end of said housings, vertical spring means between the ends of said members and the outside brackets of each of said housings, and longitudinally extending spring means between the inside brackets of each of said housings and the midportions of said side frame members.

2. In a rail truck, a truck frame including longitudinally extending side frame members rigidly spaced apart by intermediate transverse cross members, truck axles including axle housings extending transversely beneath opposite ends of said side frame members, vertical spring means between the ends of said members and said housings, and longitudinally extending spring means between said housings and the mid portions of said side frame members, said last-named spring means including upper leaf springs anchored to the center of said side frame members and having the free ends thereof connected to said housings, and lower leaf springs anchored to said housings and having the free ends thereof extending toward each other and connected to said side frame members adjacent the midpoint thereof.

3. The truck of claim 1 wherein said longitudinally extending spring means includes an upper set of springs spanning the space between said housings and lower sets of springs anchored at their opposed ends to said housings and at their adjacent ends to said side frame members, said sets of springs lying on opposite sides of a horizontal plane through the axis of said housings.

4. A rail truck including transverse axle housings, parallel side frame members extending longitudinally above said housings and overhanging the same, spring pots on the outer sides of said housings beneath the overhanging ends of said members, coil spring means supporting said ends and seated in said pots, a longitudinally extending leaf spring on the outboard side of each of said frame members and interconnected between said housings and the midportion of said side frame member, and torque reaction means disposed below said leaf spring rigidly secured to said housings.

5. The truck of claim 4 including bracket means secured to the outboard side of said side frame members and having means for anchoring the midpoint of said leaf spring and the free ends of said torque reaction means.

6. The truck of claim 4 wherein said leaf spring comprises one spring anchored at its center to said side frame member and having the ends thereof connected to said housings, and said torque reaction means includes a second leaf spring anchored at one end to said housing and connected at the free end to said side frame member, said springs being vertically spaced.

7. A rail truck comprising a frame having two side rails spaced apart by rigid transverse cross members, transversely extending axle housings adjacent each end of said frame, spring posts on the ends of said rails overhanging said housings, spring pots secured to the outer faces of said housings in alinement with said posts, coil spring means about said posts and confined between said ends of said rails and said pots, a longitudinally extending leaf spring between said housings and the midpoint of each of said side rails, and means below said springs arranged to absorb torque reactions in said housings.

8. A rail truck comprising a frame having two side rails spaced apart by rigid transverse cross members, transversely extending axle housings adjacent each end of said frame, spring posts on the ends of said rails overhanging said housings, vertical coil springs about said posts disposed between the ends of said side rails and said housings on the outer sides of said housings, a bracket on each of said side rails intermediate said housings, brackets on the adjacent faces of said housings, and leaf spring means interconnected between said brackets.

9. The truck of claim 8 wherein said spring means are vertically spaced on opposite sides of a horizontal plane through the axis of said housings.

10. The truck of claim 8 wherein said spring means includes a first spring anchored to said rail bracket and having its free ends connected to said housing brackets, and a second spring anchored to said housing brackets and having its free ends connected to said rail bracket, said springs being vertically spaced on opposite sides of a horizontal plane through the axis of said housings.

R. J. BURROWS.
ALFRED O. WILLIAMS.